United States Patent [19]
Jordan et al.

[11] 3,793,145
[45] Feb. 19, 1974

[54] NUCLEAR CONTAINMENT VESSEL AND METHOD OF MAKING SAME

[75] Inventors: Robert W. Jordan, Pittsburgh; Roger L. Cornith, Coraopolis; Norman W. Edwards, Sewickley; Stephen M. Preg, Jr., Coraopolis, all of Pa.

[73] Assignee: Pittsburgh-Des Moines Steel Company, Pittsburgh, Pa.

[22] Filed: May 25, 1971

[21] Appl. No.: 146,724

[52] U.S. Cl. ............... 176/87, 220/3, 220/5 A, 220/71, 52/249, 29/471.1, 52/169
[51] Int. Cl. ............................................. G21c 13/00
[58] Field of Search ...... 176/87, 37, 38; 220/3, 5 A, 220/71; 52/249, 80

[56] References Cited
UNITED STATES PATENTS

| | | | |
|---|---|---|---|
| 3,318,780 | 5/1967 | Bohmann et al. | 176/87 |
| 3,192,121 | 6/1965 | Challender et al. | 176/87 X |
| 3,234,102 | 2/1966 | Brown et al. | 176/87 |
| 3,127,046 | 3/1964 | Griffiths et al. | 176/87 |
| 3,212,220 | 10/1965 | Boniecki et al. | 52/80 |
| 2,651,973 | 9/1953 | Elliott | 52/80 |
| 3,438,532 | 4/1969 | Chibaeff | 52/80 |
| 3,087,883 | 4/1963 | Haftke | 176/87 |

FOREIGN PATENTS OR APPLICATIONS

| | | | |
|---|---|---|---|
| 844,188 | 8/1960 | Great Britain | 176/87 |
| 228,433 | 4/1959 | Australia | 176/87 |

*Primary Examiner*—Reuben Epstein
*Attorney, Agent, or Firm*—Shoemaker & Mattare

[57] ABSTRACT

A nuclear containment vessel and method of making same, wherein said vessel comprises a closed shell of revolution having a substantially doubly curved shape with an elongate vertical dimension, said shell comprising a plurality of different portions merging into one another, at least one of said portions having different curvature or different thickness, or different curvature and thickness than adjacent portions.

45 Claims, 21 Drawing Figures

PATENTED FEB 19 1974 3,793,145

INVENTORS
ROBERT W. JORDAN
ROGER L. CORINTH
NORMAN W. EDWARDS &
STEPHEN M. PREG
BY Shoemaker and Mattare
ATTORNEYS

INVENTORS
ROBERT W. JORDAN
ROGER L. CORINTH
NORMAN W. EDWARDS &
STEPHEN M. PREG
BY
*Shoemaker and Mattare*
ATTORNEYS

INVENTORS
ROBERT W. JORDAN
ROGER L. CORINTH
NORMAN W. EDWARDS &
STEPHEN M. PREG
BY *Shoemaker and Mattare*
ATTORNEYS

INVENTORS
ROBERT W. JORDAN
ROGER L. CORINTH
NORMAN W. EDWARDS &
STEPHEN M. PREG

BY *Shoemaker and Mattare*

ATTORNEYS

INVENTORS
ROBERT W. JORDAN
ROGER L. CORINTH
NORMAN W. EDWARDS &
STEPHEN M. PREG

BY Shoemaker and Mattare
ATTORNEYS

NUCLEAR CONTAINMENT VESSEL AND METHOD OF MAKING SAME

BACKGROUND OF THE INVENTION

This invention relates to a nuclear containment vessel and to a method of making same, wherein said vessel encloses and contains a nuclear reactor and auxiliary systems and equipment. In the event of an operating accident or malfunction of the nuclear power plant, the containment vessel must contain the environment resulting from the accident or the like, including pressure, temperature, heat, missiles, radioactive material and the like.

The nuclear containment vessel must have sufficient internal volume to allow the pressure generated as the result of an accident or malfunction of the nuclear power plant enclosed by the structure to dissipate, and the size of the structure is, therefore, related to the power capacity of the plant, such as, for example, an 1,100 megawatt plant commonly requires a free volume of slightly more than three million cubic feet. The pressure generated within the containment vessel could obviously be decreased by building a larger containment vessel, but the large size of such structures is economically impractical. Accordingly, in order to contain the environment generated within the vessel, the shape or design of the vessel is important from a size consideration in order to obtain a vessel having sufficient strength and yet to have a size which is economically feasible.

Further, the vessel must have sufficient plan or floor area such that the numerous items of equipment actually engaged in power generation can be located therein near the ground level. This equipment must be positioned so as to be easily installed, operated and serviced.

An overhead crane is generally employed for handling the equipment enclosed within the containment vessel since the equipment is usually quite heavy and the equipment must, therefore, lie within the serviceable area beneath the overhead crane. The crane must be sufficiently high so that large items can be lifted up and over adjacent items enclosed in the vessel and hence a minimum height of crane rail exists. Moreover, the crane must be capable of servicing essentially the entire working area wherein the generating equipment and auxiliary equipment is located. It is desirable that the vessel be capable of supporting the weight of the crane and the loads handled by the crane.

The nuclear containment vessel is normally enclosed inside a biological shield building usually made of concrete. The biological shield building limits the escape of radiation from within the containment vessel in the event of an accident or malfunction occurring in the reactor equipment and the auxiliary equipment associated therewith. A containment vessel is desirable which minimizes the size and cost of the biological shield building, which is generally cylindrical with a dome roof.

Further, the nuclear containment vessel itself should be economical. One factor bearing on the economics of large vessels is the fact that, to withstand the applied pressures at desirable stress levels, heavy plate thicknesses are required in the construction of the vessel. In the prior art applied to large vessels, thicknesses over 1½ inches are common. Metallurgical and residual stress considerations then require that post weld heat treatment be performed. Applicable code provisions commonly require such treatment in materials whose thickness at the weld seams exceeds a specified amount, normally 1½ inches. Accordingly, although prior art containment vessels are generally satisfactory for use in small generating plants, where less pressure, heat, and the like are encountered when an accident or the like occurs in the equipment enclosed by the vessel, and plate thicknesses can be kept below the post weld heat treatment thickness (hereinafter referred to as PWHT thickness), such vessels cannot be economically extended or enlarged to contain the larger power generating plant, as for example, those generating 1,100 megawatts, since plate thicknesses would have to be greater than the PWHT thickness in order to contain the environment therein resulting from an accident or the like. This post weld heat treatment is both time consuming and costly, and requires that some associated work cannot be done until after post weld heat treatment.

Several different constructions of prior art nuclear containment vessels are known, but as noted above, extension of prior art vessels to containment vessels for large capacity plants suffers from one or more disadvantages. First, as noted above, the size of the nuclear containment vessel must be such as to contain the environment and to allow the pressure generated therein as a result of an accident in the equipment enclosed by the vessel to be dissipated. In prior art nuclear containment vessels, plate thicknesses of 2 inches and greater are often required in order to give the vessels sufficient strength to withstand the pressures. This relatively large thickness of the plate material utilized in the construction of the vessel results in a high cost for materials. Moreover, the individual plates comprising the shell of the vessel must be field welded as full penetration butt welds in accordance with the applicable practice governing such vessels. Therefore, the labor costs for welding the plates together is very high. Moreover, as commonly practiced, post weld heat treatment is required of all vessel welds in excess of a predetermined PWHT thickness; therefore, post weld heat treatment of substantially the entire containment vessel after completion of work in the field is required. The procedure and control for this heat treating process is uncertain and could prove to be of prohibitively high cost.

Other disadvantages of prior art nuclear containment vessels are the height limitation of the working space inside the containment vessel for the crane utilized therein to handle the equipment enclosed by the vessel, and the limited plan area or floor space for the equipment, or the unaccessibility of the equipment to the crane due to the shape of the vessel. Moreover, the size of the concrete biological shield building and its supporting foundation have to be quite large and hence expensive in some prior art vessels.

The present invention solves all of the above problems by providing a nuclear containment vessel comprising a closed shell of revolution having a substantially doubly curved surface with an elongated vertical dimension, the doubly curved shell having a wall thickness equal to or less than the PWHT thickness over the major portion thereof. The doubly curved surface of the shell imparts sufficient strength to the vessel to withstand internal pressures, heat, missiles, radioactive materials and the like while enabling the use of plate thicknesses equal to or less than PWHT thickness, which thus eliminates the necessity of post weld heat treatment in the field, and also substantially reduces labor costs incurred in welding the plates together in constructing the nuclear containment vessel. Also, the reduction in overall thickness results in significant economies in material cost, and the vertical orientation of the structure gives adequate clearances both above and below a crane supported in the vessel for handling the nuclear reactor and associated equipment. Moreover, the vertical orientation of the nuclear containment vessel according to the present invention makes substantially all of the plan area or work area of the nuclear containment vessel accessible to the crane supported therein. Further, plants with multiple nuclear reactor containment vessels are becoming commonplace and in these plants common services and facilities with the various structures offer greater economy. The nuclear containment vessel's shape affects the length of expensive piping and the like used with the vessel, and this invention minimizes this length.

The present invention accomplishes these objectives with a minimum horizontal area occupied by the vessel, thus enabling a small and economical biological shield building to be used.

According to one form of the present invention, the structural support for the crane carried in the nuclear containment vessel is common with a reinforcing band around the vessel. The band, accordingly, accomplishes two purposes: that of supporting the crane, and that of reinforcing the containment vessel. Further, the reinforcing band is positioned above or below the vessel's mid-height closely adjacent thereto, and thus allows greater flexibility in the location of major openings or hatches.

Moreover, with a steel shell vessel, the concrete biological shield building can be constructed after the steel containment vessel is completed, and the plant's construction can continue inside the steel containment vessel unaffected by the shield's erection.

Elimination of post weld heat treatment permits earlier scheduling of work inside the vessel. This advantage enhances the construction time schedule and therefore reduces the cost.

Large hatches for the very infrequent removal of large equipment could be eliminated because heat treatment is not required in welds in the vessel shell. Whenever a large access opening is required into the vessel, a section of vessel wall could be cut out and economically rewelded after completion of work. Thicker walls requiring heat treatment would make this alternative impractical because of the cost involved and because of the presence of power generating equipment in the vessel.

Since post weld heat treatment of welds to the vessel shell is expensive and difficult to control primarily when performed on the vessel itself, the vessel could be economically constructed from various sub-assemblies in which the thickness could exceed the PWHT thickness, because the welds within the sub-assemblies could be heat treated prior to assembly of the sub-assemblies on the vessel being erected.

In this regard, each of the several forms of nuclear containment vessel according to the invention comprises a number of portions having different curvature, or different thickness, or different curvature and different thickness, with the portions welded together at adjacent edges to complete the vessel. Each of the portions could comprise a sub-assembly including at least one annular section or ring constructed of a number of plates welded together to form the rings. If a portion comprises more than one ring, the rings would be welded together along their adjacent horizontal edges to form the portion.

The various sub-assemblies could be constructed in the shop or in the field. For example, two or more plates in a ring could be welded together in the shop before shipment to the field. At the field, an entire ring could be sub-assembled on the ground and then set into place on top of the vessel being erected. When a vessel is constructed from such sub-assemblies, it is possible to economically post weld heat treat welds made within the sub-assemblies before the sub-assemblies are placed on the vessel being erected. The welds at the edges of portions or sections which are welded together in erecting the vessel shell would not be greater than the PWHT thickness, however. Obviously, the welds within a sub-assembly could be made not greater than the PWHT thickness, if desired, but the sub-assembly construction permits a vessel to be economically constructed when such welds are greater than the PWHT thickness.

OBJECTS OF THE INVENTION

It is an object of this invention to provide a nuclear containment vessel which is economical in construction.

Another object of this invention is to provide a nuclear containment vessel which has a size and shape to contain the environment caused by an accident or malfunction in a nuclear reactor or auxiliary equipment enclosed within said vessel and which provides adequate space for said equipment enclosed therein.

An even further object of this invention is to provide a nuclear containment vessel which comprises a closed shell of revolution having a doubly curved surface elongated in a vertical direction and which has a wall thickness throughout the major portion thereof less than or equal to the PWHT thickness when constructed of steel or the like.

A further object of this invention is to provide a nuclear containment vessel which is comprised of a shell of revolution having a doubly curved surface, said shell having an elongated vertical dimension, and which has adequate strength and size to contain the environment in said vessel caused as a result of an accident or malfunction in nuclear equipment enclosed therein and which, at the same time, affords adequate working space and area for equipment enclosed therein and yet which occupies a relatively small horizontal area.

An even further object of this invention is to provide a nuclear containment vessel which is comprised of a shell of revolution formed by rotating a curved line about a vertical axis, said curved line comprised of a plurality of curved segments or sections each of which may have different curvatures.

It is an even further object of this invention to provide a nuclear containment vessel comprising at least two main shell sections and at least one annular stiffening and reinforcing ring joining said main shell sections at adjacent ends thereof.

A still further object of this invention is to provide a nuclear containment vessel comprising at least three main shell sections, with an upper main shell section, a lower main shell section and intermediate main shell section joined together, with an annular reinforcing band between adjacent sections.

A further object of this invention is to provide a nuclear containment vessel constructed from sub-assemblies of pre-welded parts.

Yet another object is to provide a method of constructing a nuclear containment vessel wherein the vessel is economically constructed from sub-assemblies within which the welds may exceed the PWHT thickness.

DETAILED DESCRIPTION OF THE INVENTION

Figure 1:
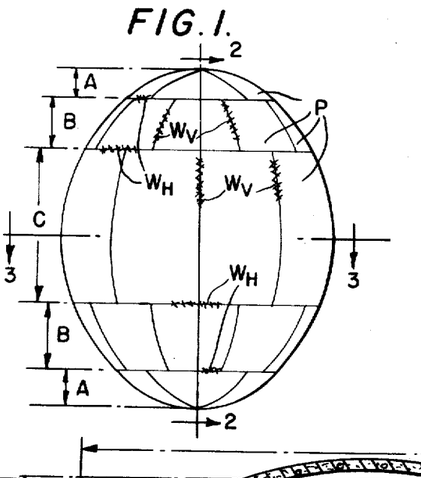
FIG. 1 is a side view in elevation of a first form of nuclear containment vessel according to the invention, with the surrounding biological shield building omitted.
Figure 2:
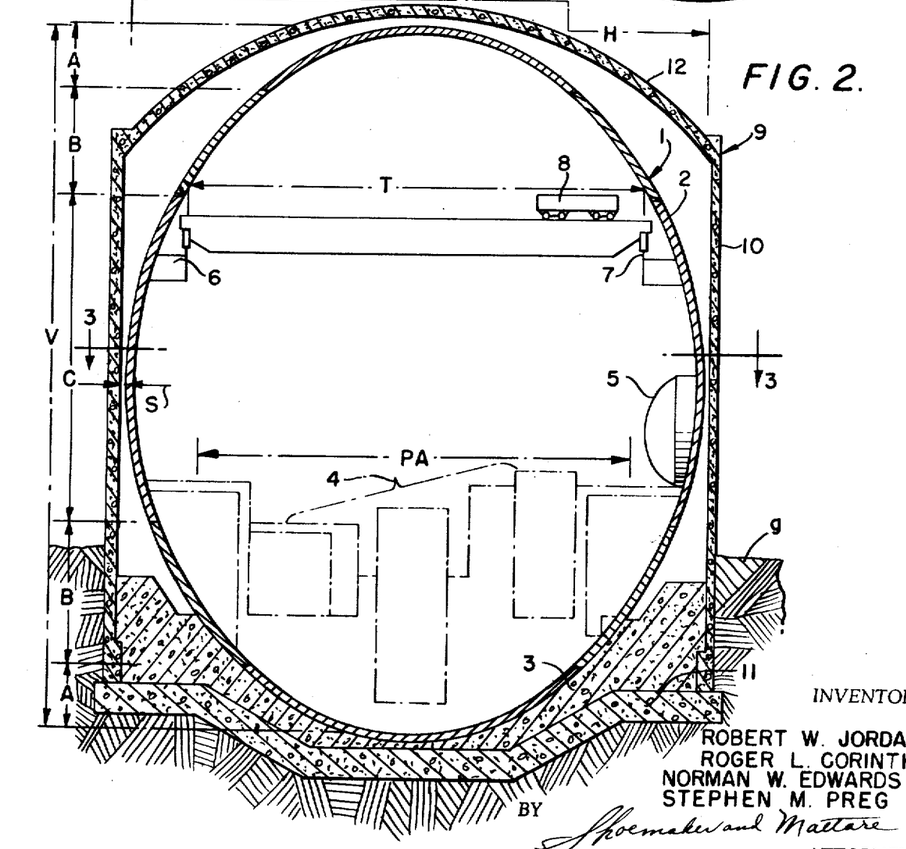
FIG. 2 is a schematic sectional side view of the vessel shown in FIG. 1 taken along line 2—2, and including the biological shield building.
Figure 3:
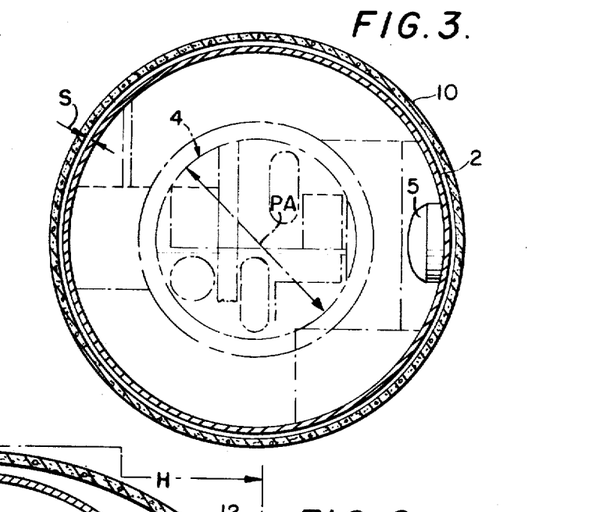
FIG. 3 is a sectional view of the vessel shown in FIG. 1 and is taken along the line 3—3, and including the biological shield building.

Referring now to the drawings, wherein like reference numerals refer to like parts throughout the several views, a preferred form of nuclear containment vessel is indicated generally at 1 in FIGS. 1, 2 and 3, and comprises a shell of revolution 2 having a shape approximating that of a prolate spheroid with each half having three major portions A, B and C, and in this form of the invention, each portion has a different curvature and thickness than the adjacent portion. Although the vessel could be made of prestressed concrete or the like, it is preferably formed of a plurality of steel plates P joined together with full penetration butt welds W along adjacent edges thereof. The shell of revolution has an elongated vertical dimension V and a horizontal dimension H less than the vertical dimension V, and the vessel is preferably recessed into the ground g and rests on a concrete pad or bed 3 suitably contoured to conform to the shape of the lower end of the shell of revolution 2 and contacting the lower end of the shell.

The wall of the shell of revolution 2 has a varying thickness, being thinnest over the end portions A, which have the greatest curvature or shortest radius of curvature, and increasing in thickness through intermediate portions B, to the thickest portion at the middle part of the vessel at portion C, which has the least curvature or largest radius of curvature. Power generating equipment such as a nuclear reactor and associated equipment, such as turbines, heat transfer media and the like, are supported in the lower portion of the shell of revolution 2 and are diagrammatically illustrated in phantom lines at 4 in FIGS. 2 and 3. A suitable access hatch or opening 5 is in one side of the containment vessel for permitting access to the interior thereof and is closable to close the containment vessel. The positioning of this access hatch 5 is variable within certain limits dictated by the positioning of the various equipment supported and enclosed within the shell 2. If desired, the access hatch could be omitted and a hole simply cut in the wall of the vessel. The hole would be welded closed after use of the opening is no longer desired. A crane girder 6 having a crane rail 7 is suitably supported by the shell of revolution 2 on the inside surface thereof at the upper end of portion C of the shell and a polar crane 8 is supported on the crane rail 7. The crane 8 has a traverse T substantially equal to the working space or plan area PA of the equipment 4 supported in the lower portion of the shell 2 and, accordingly, substantially all of the equipment enclosed in the containment vessel is accessible to the crane 8.

The containment vessel 1, if constructed of steel or the like, is enclosed within a concrete biological shield building 9 having a cylindrical side wall 10 supported on a suitable foundation 11 and a dome-shaped roof or top 12. The cylindrical side wall 10 is spaced from the mid-portion of the shell of revolution 2 a minimum distance S.

By way of specific example, a containment vessel 1 built in accordance with the invention would have a vertical dimension V of approximately 212 feet, a horizontal dimension H of approximately 169 feet, a wall or plate thickness at the end portions A of approximately 1 inch, a thickness in the intermediate portions B of approximately 15/16 inches and a thickness in the middle portion C of approximately 1½ inches. The crane would have a traverse T of approximately 136 feet and the shell 2 would enclose a volume of approximately 3.17 million cubic feet and would weigh approximately 5.9 million pounds. The distance S would preferably be about 3 feet.

If desired, the vessel could be constructed from sub-assemblies, and in this embodiment, each portion would comprise a single annular ring or section $a$, each annular ring or section being comprised of a plurality of the plates P welded together as at $W_v$, along adjacent vertical edges. In constructing this vessel from sub-assemblies, a pair of plates P would be welded together in the shop and shipped to the field. At the field, an entire ring or section $a$, or in this case, portion A, B or C, could be welded together at $W_v$ and the ring or portion placed in position at the top of the vessel being erected and welded at $W_h$ to an adjacent portion. When the vessel is constructed of sub-assemblies in this manner, the welds $W_v$ within the portions A, B or C could be greater than the PWHT thickness and the vessel could still be economically constructed. The welds $W_h$ at least at the edges of the portions would be not greater than the PWHT thickness, however.

Figure 4:
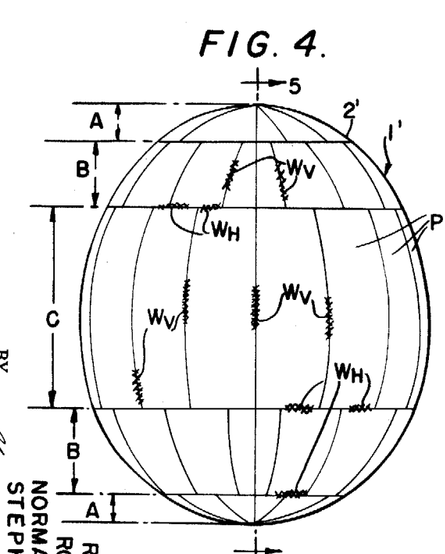
FIG. 4 is a view similar to FIG. 1 of a second form of the vessel.
Figure 5:
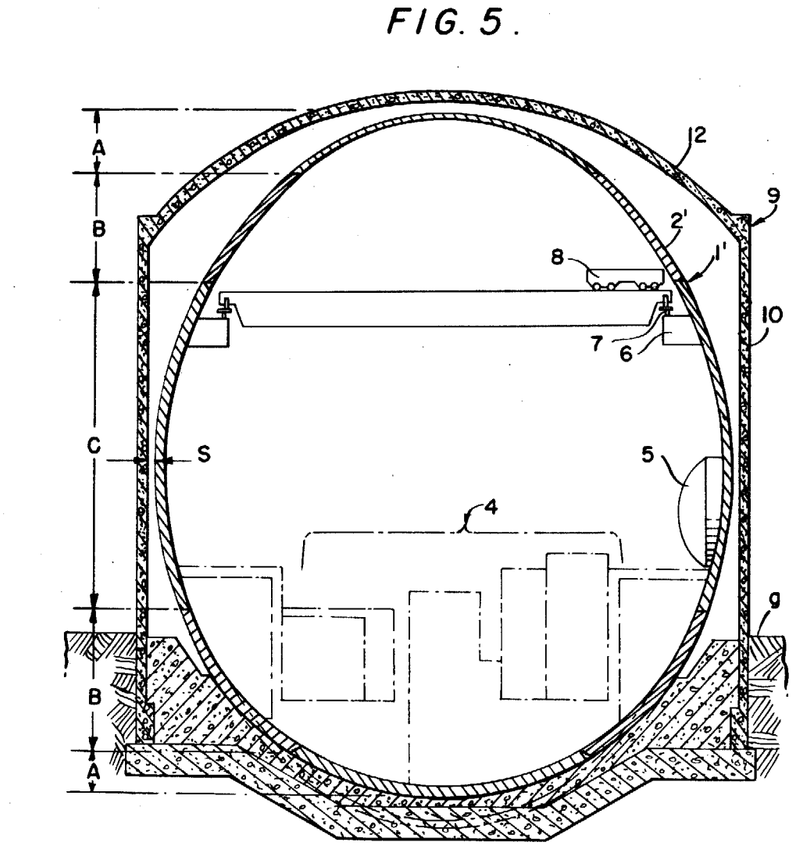
FIG. 5 is a view similar to FIG. 2 of the modified form of the invention in FIG. 4 and is taken along line 5—5, and including the biological shield building.

Referring now to FIGS. 4 and 5, a modification of the invention illustrated in FIGS. 1, 2 and 3 is shown and is identical in every respect with the invention illustrated and described with reference to FIGS. 1, 2 and 3, except that the bottom end of the shell of revolution 2' comprising the vessel 1' is flattened to provide an increased plan or floor area for the equipment 4 supported therein. This containment vessel is more nearly egg-shaped and the flattened bottom end may comprise a spherical zone or it may be elliptical or the like, as desired. Inasmuch as the bottom end of the shell of revolution 2' is flattened, the wall thickness thereof would be greater than the wall thickness at the upper end and would be approximately 1½ inches in a typical installation. This vessel could be constructed from sub-assemblies in the same manner as the FIG. 1 embodiment.

Figure 6:
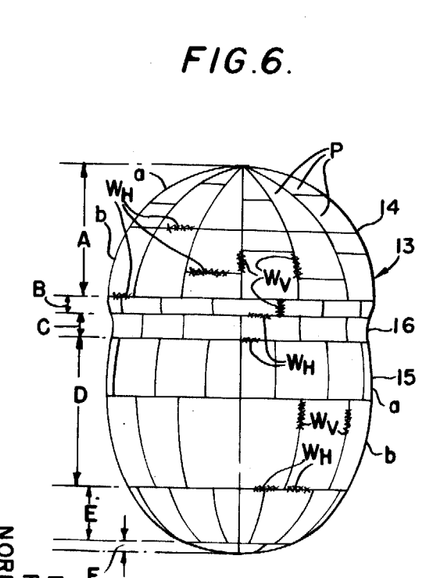
FIG. 6 is a view similar to FIG. 1 of a third form of the vessel.
Figure 7:
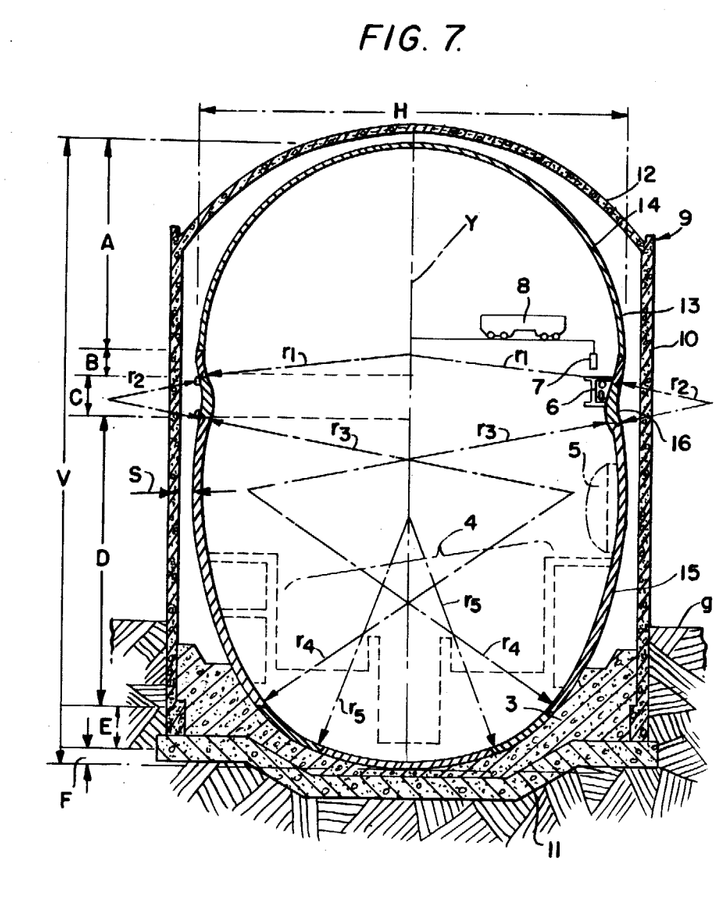
FIG. 7 is a view similar to FIG. 5 and is a vertical cross section of the third form of the vessel and including the biological shield building.

Referring now to FIGS. 6 and 7, a third form of the invention is shown and comprises a vessel 13 defined by a shell of revolution having an upper main shell section 14 and a lower main shell section 15. The shell of revolution comprising the vessel 13 is generated by revolving a curved line about a vertical axis Y, said line comprising a plurality of portions A through F, and formed to close the upper and lower ends of the shell of revolution. Each portion A through F has either a different curvature or a different thickness than the adjacent portion, or the portions may have both a different curvature and a different thickness, if desired. The adjacent ends of the upper and lower main shell sections 14 and 15 are suitably connected as by welding or the like to the upper and lower edges respectively of an annular stiffening and reinforcing band or ring 16, which is positioned above the vertical mid-portion of vessel 13.

The upper main shell section 14 comprises a hemispherical portion A extending over approximately four-fifths of the upper main shell section from the closed end thereof toward the stiffening ring or band 16, and a spherical portion or zone B joining the hemispherical portion to the reinforcing and stiffening band. The upper main shell section 14 has a radius of curvature $r_1$, and substantially constant wall thickness throughout, said thickness being less than or equal to the PWHT thickness, as for example, 1½ inches. The annular stiffening and reinforcing band or ring 16 extends over the portion C between the upper and lower main shell sections. The portion C may be curved, if desired, having a radius of curvature $r_2$.

Approximately the upper two thirds of the lower main shell section 15 comprises a first portion D having a radius of curvature $r_3$ and a first wall thickness, said portion having the shape of two truncated ogives with a common base between them. A second portion E having a different and shorter radius of curvature $r_4$ than the portion D extends from the lower part of portion D and has the shape of a truncated non-standard ogive and connects at its lower end with a third portion F having the shape of a spherical segment, said spherical segment closing the lower end of the lower main shell section 15 and having a radius of curvature $r_5$. The wall thickness of the portions E and F is the same, but the curvature of each portion is different. The portions E and F have the thinnest wall sections and portion D has the thickest wall section, all of the wall thicknesses being less than or equal to the PWHT thickness, as for example, 1½ inches.

As in the previous embodiments of the invention, the containment vessel is recessed into the ground $g$ and is supported on a concrete pad or base 3. A biological shield building 9 surrounds and encloses the vessel 13 and has a cylindrical side wall 10 and domed roof 12 and is supported on a foundation 11.

An access hatch 5 is in the lower main shell section 15 for permitting entry to the interior of the vessel 13. Power generating equipment 4, including a nuclear reactor and auxiliary equipment, is supported in the lower main shell section 15. In this embodiment, the crane girder 6 actually comprises a part of the reinforcing or stiffening band 16 and serves to stiffen and reinforce the containment vessel as well as to support the crane rail 7 and crane 8 thereon. The structure is thus simplified since a separate crane girder secured to a different portion of the interior of the shell of revolution in not required as in the previous embodiments. Moreover, in this embodiment, the vertical dimension V is greater than the vertical dimension of the previous embodiments and the horizontal dimension H is less than the horizontal dimension of the previous embodiments.

Even greater accessibility to the equipment 4 from the crane 8 is possible with this embodiment than with the previous embodiments, and the vessel occupies even less horizontal area than the previous embodiments.

By way of specific example, a containment vessel in accordance with this embodiment would have a vertical dimension V of approximately 223 feet, and a horizontal dimension H of approximately 154 feet. The hemispherical portion A and spherical zone portion B each have a radius of curvature $r_1$ of approximately 75 feet and a wall thickness of approximately 1 inch. Portion C, if curved, would have a radius of curvature $r_2$ of 32 feet and a wall thickness of about 3 inches. Portion D would have a radius of curvature $r_3$ of about 135 feet and a wall thickness of approximately 1.5 inches.

Portions E and F would have a wall thickness of approximately 1.17 inches, with portion E having a radius of curvature $r_4$ of about 45 feet and portion F having a radius of curvature $r_5$ of about 90 feet. In this embodiment, the crane girder and stiffening ring or reinforcing band would be disposed approximately 16 feet above the top of access hatch 5 and the reinforcing band would have a wall thickness of approximately 3 inches, as noted above, but since this portion of the vessel represents a relatively small portion of the shell of revolution, the cost involved in welding and post weld heat treatment of the welds would be relatively small. As in the previously described embodiments, the vessel preferably comprises a plurality of steel plates P or the like welded together along adjacent edges by full penetration butt welds W.

If desired, this embodiment of the vessel could also be constructed from sub-assemblies as in the previous embodiments. As seen in FIG. 6, the portions A and D would each comprise a pair of annular rings or sections $a$ and $b$ welded together at adjacent edges as at $W_h$. The sections $a$ and $b$ would each comprise a plurality of the plates P welded together along adjacent edges as at $W_v$. The portions B, C, E and F each comprise a single annular ring or section made up of a plurality of plates P welded together at $W_v$. The welds $W_v$ within the portions could be greater than the PWHT thickness if desired, and the vessel would still be economical, but the welds $W_h$ at least at the edges of the portions A, B, C, D, E and F are not greater than the PWHT thickness.

Figure 8:
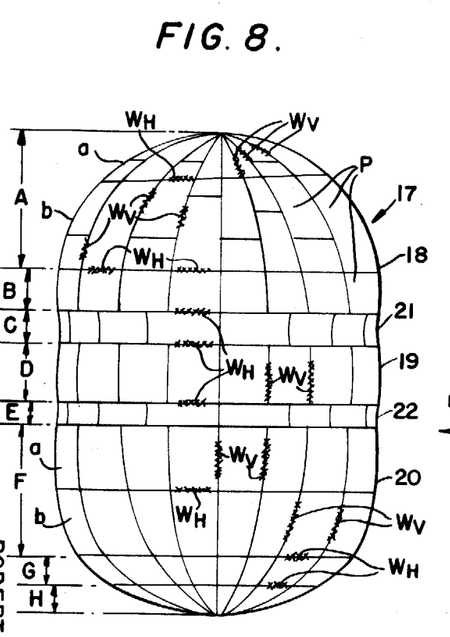
FIG. 8 is a view similar to FIG. 1 of a fourth form of the vessel.
Figure 9:
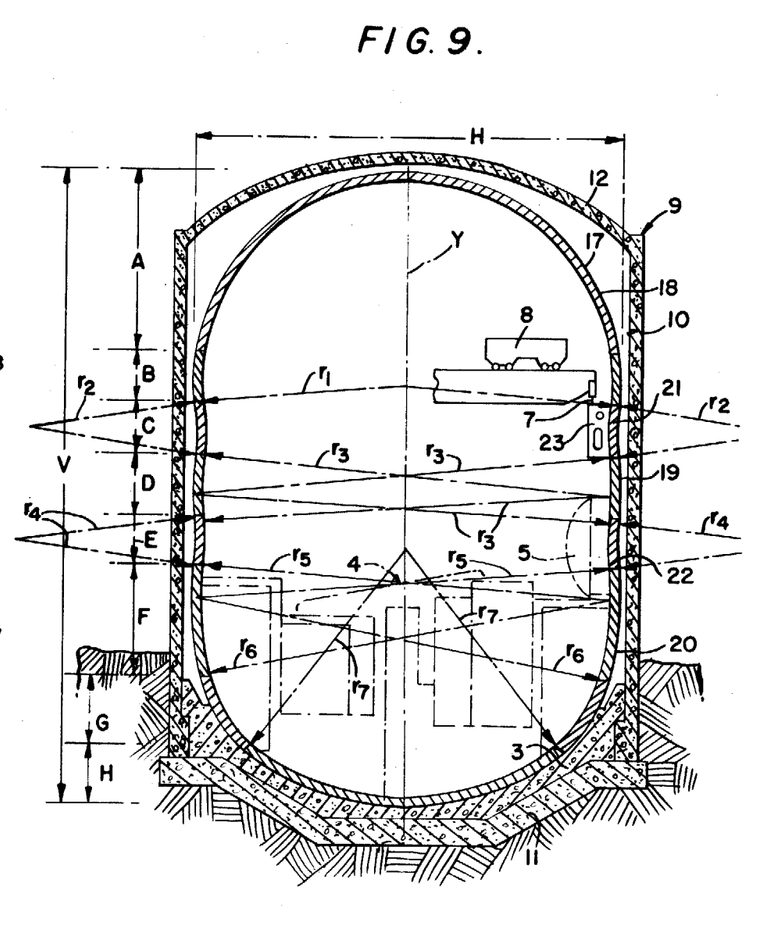
FIG. 9 is a view similar to FIG. 5 and is a vertical cross section of the fourth form of the vessel and including the biological shield building.

Referring now to FIGS. 8 and 9, a fourth form of the invention is illustrated and comprises a vessel indicated generally at 17 and defined by a shell of revolution having an upper main shell section 18, a middle or intermediate main shell section 19 and a lower main shell section 20. The shell of revolution comprising the vessel 17 is generated by rotating a curved line about the vertical axis Y of the shell, said curved line having a plurality of segments or portions A through H of different curvature and formed so that the shell is closed at its upper and lower ends.

The upper main shell section 18 is comprised of a hemispherical portion A and a spherical zone or portion B, the portion A comprising approximately five-sixths of the upper main shell section. The wall thickness of the upper main shell section, which comprises portions A and B, having a radius of curvature $r_1$, is substantially constant throughout and is not greater than the PWHT thickness, or about 1½ inches, for example. The bottom edge of the upper main shell section is joined, as by welding or the like, to the upper edge of an annular stiffening ring 21 or reinforcing band which comprises a portion C in the shell of revolution 17. The portion C may be curved, if desired, with a radius of curvature $r_2$. The bottom edge of the stiffening ring 21 is secured as by welding or the like to the top edge of the intermediate main shell section 19 which comprises two truncated ogives with a common base and is designated as portion D. The portion D has a radius of curvature $r_3$, equal to the diameter of the vessel at this portion.

The bottom edge of the intermediate main shell section 19 is joined, as by welding or the like, to the top edge of a second annular stiffening ring 22 which comprises a second portion E. The portion E may also be curved, with a radius of curvature $r_4$. The top edge of the bottom main shell 20 is joined, as by welding or the like, to the bottom edge of the second stiffening ring 22. The bottom main shell section comprises three portions F, G, and H each having a different radius of curvature, $r_5$, $r_6$ and $r_7$, respectively, with approximately the top half of the bottom main shell section being in the portion F and having the shape of a truncated ogive. The portion F blends into an intermediate portion G which has the shape of a non-standard truncated ogive and has a sharper curvature than the portion F. The bottom end of the lower main shell 20 is closed by a spherical segment portion H which has less curvature than the portion G. The wall thickness of the shell in each of the portions is different, with the thickness in the portions C and E being approximately 3 inches and the thickness in portion F comprising the thickest portion of the lower main shell section, and the portion G comprising the thinnest wall portion with portion H having an intermediate thickness. None of the wall thicknesses in vessel 17 exceeds the PWHT thickness, which is about 1½ inches as currently practiced, except for portions C and E which are thicker, being approximately 3 inches.

The vertical dimension V of the containment vessel 17 is the same as the vertical dimension of the embodiment illustrated in FIG. 7; that is, 223 feet, but the horizontal dimension H is less than the horizontal dimension of the embodiment illustrated in FIG. 4, being on the order of 150 feet.

A crane girder 23 is secured to the inside part of stiffening ring 21 and actually comprises a portion of the stiffening ring and supports a crane rail 7 and polar crane 8 thereon. This construction is substantially the same as the construction of the crane girder 6 and stiffening ring 16 in the FIG. 7 embodiment. An access hatch 5 is positioned in the vessel adjacent the second stiffening ring 22 for access to the interior of the vessel, and power generating equipment 4, including a nuclear reactor and auxiliary equipment, is enclosed therein as in the previous embodiments.

A biological shield building 9 surrounds the vessel 17 as in the previous embodiments and is identically constructed, except that the diameter thereof is somewhat smaller than the diameter of the biological shield building in the FIG. 7 embodiment, since the horizontal dimension of the vessel is smaller.

As in the previously described embodiments, the vessel shown in FIGS. 8 and 9 could be constructed from pre-assembled sub-assemblies, if desired. In such event, the portions A and F, for example, would each comprise a pair of annular rings or sections $a$ and $b$ welded together along their adjacent edges at $W_h$ and the remaining portions, B, C, D, E, G and H would each comprise a single annular ring or section, each of the sections comprising a plurality of plates P welded together at their adjacent edges $W_v$. When the vessel is constructed from such a sub-assembly of parts, the welds within a portion, such as a $W_v$ between adjacent plates in an annular ring or section of plates, may exceed the PWHT thickness and still be economical. The welds $W_h$ at the edges of the portions A, B, C, etc., which are assembled together to form the vessel, are not greater than the PWHT thickness, however.

In each of the four embodiments of the invention described hereinabove, the plate thickness at the weld seam is the critical factor from the standpoint of post weld heat treatment and the remainder of the plates themselves may be thicker than the PWHT thickness, if desired.

With respect to the sub-assembly construction of the vessels according to the several embodiments of the invention, thicknesses at the weld seams within the portions in excess of the PWHT thickness are economically permissible since post weld heat treatment can be performed on the welds within the sub-assemblies prior to the time they are assembled on the vessel being erected.

Figure 10:
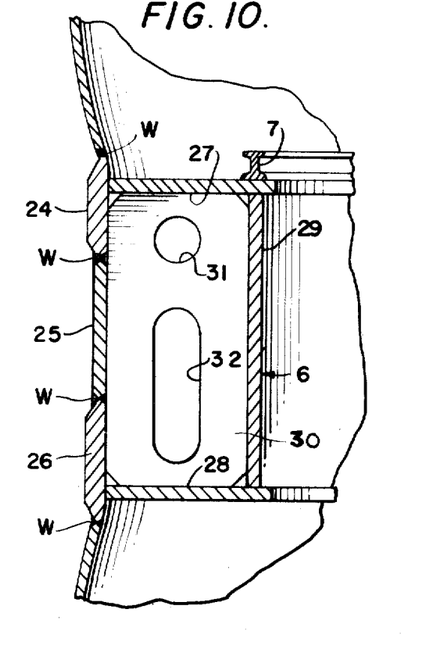
FIG. 10 is an enlarged sectional view of one form of annular stiffening ring or band and crane girder as used in the various forms of the present invention.

FIGS. 10 through 16 illustrate various constructions of the annular stiffening ring or reinforcing band and crane girder. In FIG. 10, the stiffening ring comprises three sections 24, 25 and 26 welded together along adjacent edges by full penetration butt welds W, with the upper and lower sections 24 and 26 having a greater thickness than the intermediate section 25. The upper edge of section 24 is welded to the adjacent lower edge of the upper main shell section by means of a full penetration butt weld W and the lower edge of bottom section 26 is welded to the adjacent top edge of the bottom main shell section by means of a full penetration butt weld W. The crane girder 6 comprises a pair of vertically spaced upper and lower annular plates 27 and 28 welded along their outer peripheral edges to the inside surfaces of upper and lower sections 24 and 26, respectively, of annular stiffening ring 16, and an annular cylindrical ring 29 welded between the inner marginal edge portions of upper and lower plates 27 and 28. A plurality of circumferentially spaced diaphragm plates 30 having cut-out portions 31 and 32 therein are welded around the circumference of the crane girder between the upper and lower plates 27 and 28 and the inner plate 29 to reinforce the crane girder and stiffening ring 16. The crane rail 7 is supported on top of the upper plate 27 in vertically aligned relationship with the annular cylindrical ring or wall 29.

Figure 11:
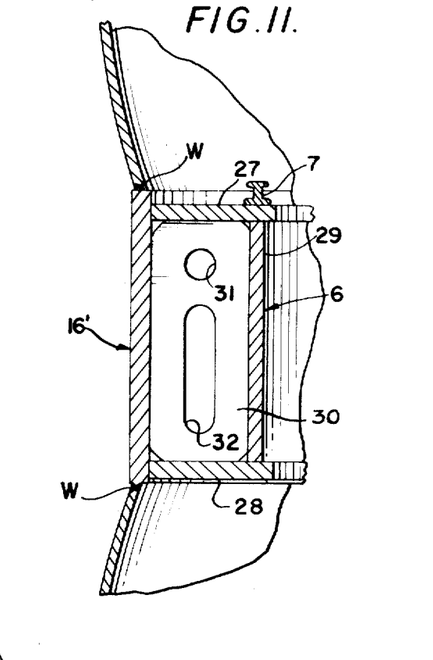
FIG. 11 is an enlarged sectional view of a modified form of annular stiffening ring or band and crane girder.

A slightly modified form of annular stiffening ring 16' is shown in FIG. 11. The details of construction of this form of the invention are identical with the construction illustrated in FIG. 10, except that the stiffening ring 16' comprises a single plate of material having uniform thickness and welded between the bottom edge of the upper main shell section and the top edge of the lower main shell section.

Figure 12:
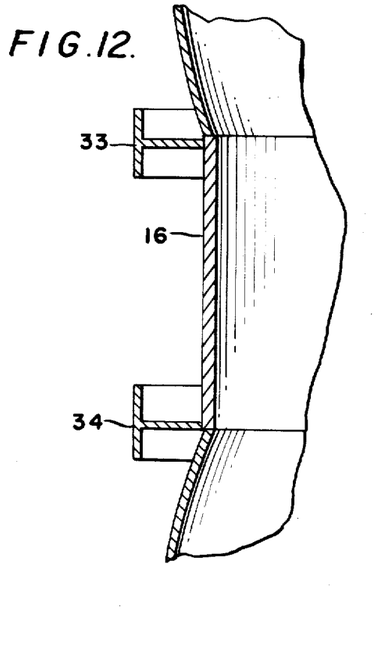
FIG. 12 is an enlarged sectional view of an annular stiffening ring or band similar to FIG. 11, with additional T-section stiffener rings on the outside surface thereof.

The annular stiffening ring 16 or 16' could have additional stiffening means thereon as shown in FIG. 12. This additional stiffening means comprises a pair of vertically spaced T-section annular stiffening rings 33 and 34 welded about the outer surface of the stiffening ring 16 adjacent the upper and lower edges thereof. The crane girder 6 could be secured to the inside surface of stiffening ring 16 as in the FIGS. 10 and 11 embodiments, if desired.

Figure 13:
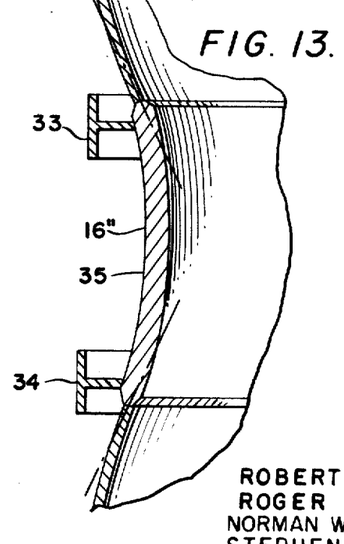
FIG. 13 is a view similar to FIG. 12 wherein the annular stiffening ring or band is arcuately shaped, with the meridional tangents of the stiffening ring or band and adjacent main shell sections being colinear.

FIG. 13 is substantially identical to FIG. 12, except that the stiffening ring 16'' is curved with the concave side 35 facing outwardly. The curvature of the stiffening ring 16'' is such that the meridional tangents of the stiffening ring at the upper and lower edges thereof coincide with the meridional tangents of the upper and lower main shell sections at the juncture of the main shell sections with the stiffening ring.

Figure 14:
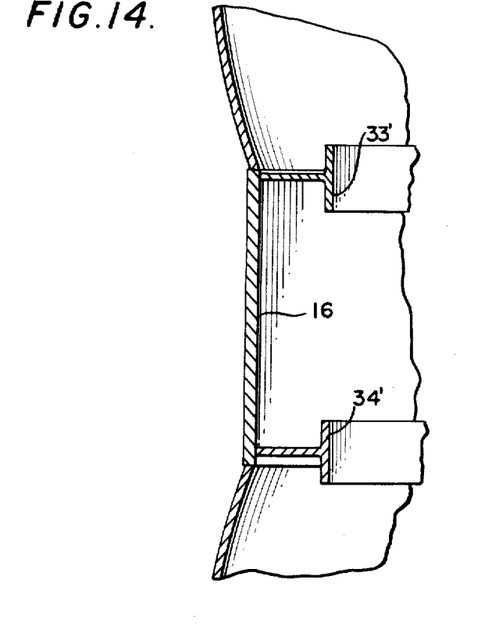
FIG. 14 and 15 are views similar to FIGS. 12 and 13, but with the annular T-section stiffening rings disposed on the inside surface of the annular stiffening ring or band.
Figure 15:
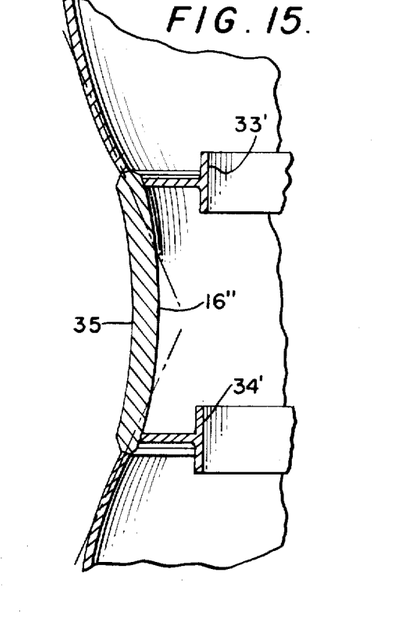

FIGS. 14 and 15 are identical to FIGS. 12 and 13, except that the additional T-section stiffening rings 33' and 34' are welded to the inside surface of the annular stiffening rings 16 and 16''.

Figure 16:
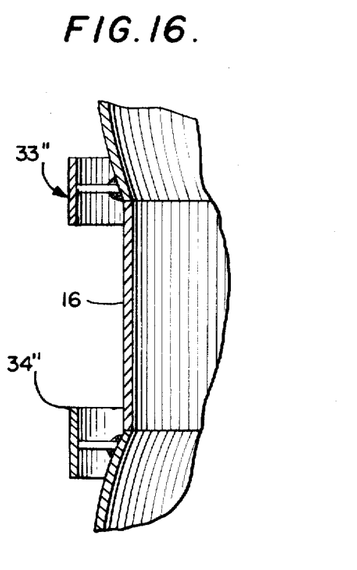
FIG. 16 is a view similar to FIG. 12 with the annular stiffening rings on the upper and lower main shell sections.

FIG. 16 is a view similar to FIG. 12, but with the annular T-section stiffening rings 33'' and 34'' welded to the upper and lower main shell sections, respectively, adjacent the edges thereof which are welded to the annular reinforcing band 16.

Figure 17:
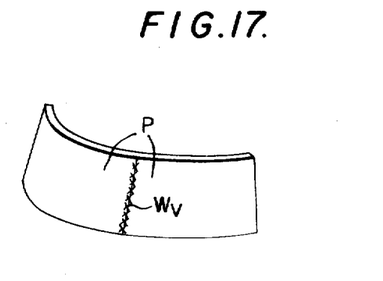
FIG. 17 is a top perspective view of a pair of plates welded together in a sub-assembly.
Figure 18:
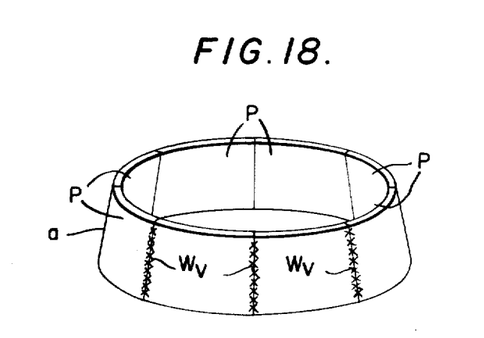
FIG. 18 is a top perspective view of an annular section or ring comprising a further sub-assembly of a plurality of welded together plates.

FIGS. 17 through 20 illustrate various steps in the construction of a vessel from sub-assemblies. In FIG. 17, a pair of plates P are shown welded together as at $W_v$ along their adjacent edges to form a sub-assembly. These plates may be welded together in the shop if desired, before shipment of the plates to the field. If the plates P have a thickness at the weld seam $W_v$ greater than the PWHT thickness, the weld may be economically heat treated before the plates are welded into the shell of the vessel being erected.

Figure 19:
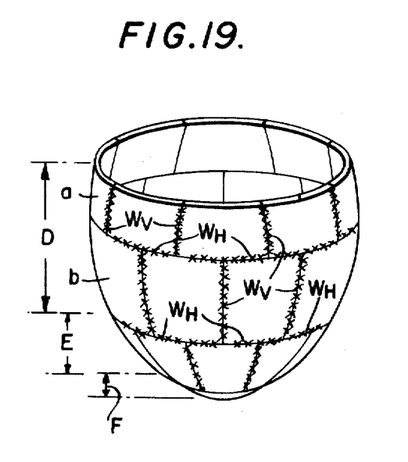
FIG. 19 is a top perspective view of a partially completed vessel shell showing how the various portions are welded together to form the vessel.

In FIG. 19, a plurality of plates P are shown welded into an annular section or ring $a$ comprising a further sub-assembly. This section or ring $a$ may be welded together in the field prior to assembly in the shell of the vessel being erected and economically heat treated at the welds, if required, as noted above.

Figure 20:
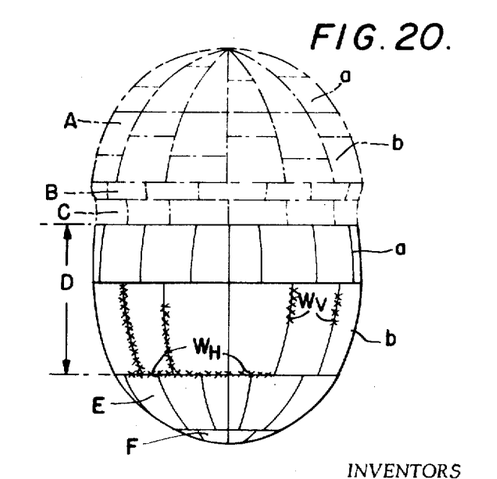
FIG. 20 is a top perspective view, shown partially in phantom line, of a completed vessel constructed from sub-assemblies.

The section $a$ is then placed in position on top of another similar section $b$ on the vessel and welded in place at $W_h$ as seen in FIGS. 19 and 20. The thickness of the plates at least at the weld seams $W_h$ is less than the PWHT thickness to avoid the necessity of post weld heat treatment of the vessel shell itself.

The edges of the plates P throughout the vessel shell could be made less thick than the PWHT thickness, if desired, but it is important that the thickness at least at the edges of the various portions is not greater than the PWHT thickness, as noted previously herein.

Figure 21:
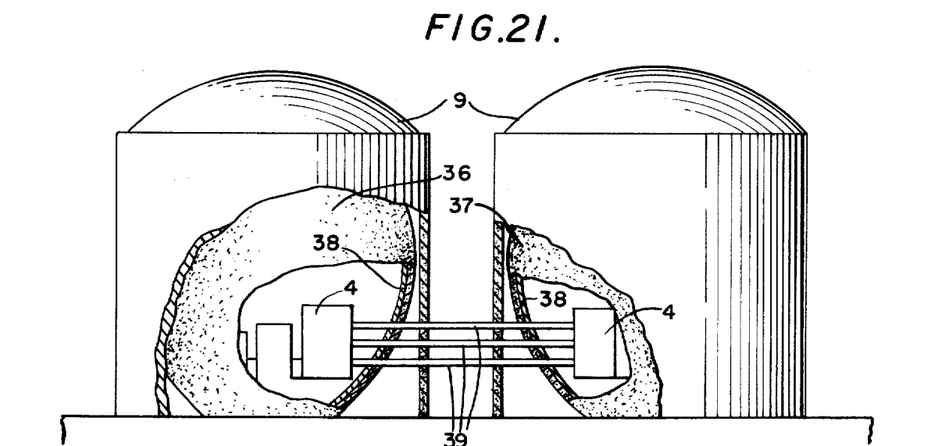
FIG. 21 is a view in elevation, partly broken away, of a plurality of containment vessels and associated equipment connected together, and showing a portion of the piping therebetween.

FIG. 21 illustrates a pair of nuclear containment vessels 36 and 37 and their biological shield buildings 9 in accordance with the present invention, with the vessels 36 and 37 having the approximate shape of a prolate spheroid as in FIG. 1 but made of reinforced concrete with a metal liner 38, such as steel or the like. A plurality of pipes 39, such as steam pipes and the like, are connected between the equipment 4 in one vessel 36 and the equipment 4 in the other vessel 37. As can be seen, the length of these pipes is minimized due to the vertical orientation of the vessels and the smaller horizontal dimensions thereof.

Each of the four embodiments of the nuclear containment vessel as described herein comprises a shell of revolution having at least three portions extending over at least half of the vertical extent of the shell of revolution, each portion having either a different curvature or a different wall thickness than the other portions, or each portion could have both a different curvature and a different wall thickness than the adjacent portions, and the major portion of the wall of each of the shells of revolution has a thickness of not greater than the PWHT thickness, or about 1½ inches according to current practice.

Each of the four embodiments of the nuclear containment vessel described herein comprises a shell of revolution having portions generated by revolving curved lines about a vertical axis. The curved lines could comprise circular arcs having a radius of curvature, or the curved lines could be ellipses, parabolas, hyberbolas or the like. The only restriction is that the surface generated be appropriate for the intended purpose and the distribution of equipment therein and the thickness of shell and other structural considerations be adequate.

While the embodiments described herein have been for a vessel constructed of steel, many of the advantages of this invention are applicable to vessels constructed of other metals or materials such as reinforced concrete, such as vessels 36 and 37. If constructed of concrete or the like, a metallic liner may be required to insure leak tightness, as seen in FIG. 21.

The description of the geometry of the curved lines revolved around the vertical axis to generate the doubly curved surfaces, and the description of the geometry of the curved surfaces themselves, has been in terms of exact mathematical expressions, i. e., circles, ogives, spheres and the like. However, standard practice in drafting rooms and fabricating facilities is to approximate such exact lines and surfaces and this application is to be understood as being included in this invention.

Further, while the major portion of the walls of the vessels according to the several embodiments of the invention have been described as having a wall thickness of not greater than the PWHT thickness, the walls could have a thickness greater than the PWHT thickness, if desired, so long as the thickness of the walls or plates P at the areas of the welds W does not exceed the PWHT thickness.

Moreover, when the vessels are constructed of reinforced concrete, the PWHT thickness would have no significance, but the walls would have varying thickness and curvature to achieve the desired strength and thin wall construction as in the embodiments specifically described herein.

It is to be understood that wherever in this application reference is made to a "radius of curvature," the curvature being referenced is that known more precisely as the meridional radius of curvature, and further that, references to "curvature" refers to the reciprocal of the meridional radius of curvature.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A nuclear containment vessel supporting and containing a nuclear reactor and auxiliary equipment therewithin, said containment vessel comprising a plurality of superposed, prefabricated annular rings welded together at adjacent edges, said rings comprising a plurality of concavo-convex steel plates welded together at adjacent edges, said welded together rings defining a concavo-convex vessel having a horizontal dimension of at least about 140 feet and a vertical dimension of at least about 200 feet, the ratio of the horizontal dimension to the vertical dimension being at least less than about 0.85 and the vessel having substantially the shape of a prolate spheroid and being substantially symmetrical about its center, the concavo-convex configuration of the containment vessel resulting in the thickness of the steel plates at least at the edges of the rings being not greater than the thickness at which post weld heat treatment is required by applicable codes in such a containment vessel, while at the same time the above structure results in the containment vessel having sufficient strength and size to withstand forces imposed thereon due to malfunction of the nuclear reactor or auxiliary equipment supported and confined therewithin, thus resulting in a substantial savings in material and time and cost of construction of the nuclear containment vessel, and resulting in the containment vessel occupying a smaller horizontal area than prior art nuclear containment vessels of a predetermined comparable volumetric capacity, a concrete biological shield building surrounding the containment vessel in spaced relationship thereto to prevent escape of radiation, and said vessel supported at a lower end portion thereof on a concrete foundation, said concrete foundation contacting and contoured to conform to the shape of the lower end portion of the vessel.

2. A nuclear containment vessel as in claim 1, wherein the horizontal dimension of the vessel is about 169 feet and the vertical dimension of the vessel is about 212 feet.

3. A nuclear containment vessel as in claim 1, wherein the upper and lower halves of said vessel each comprise at least three portions having different curvatures and different wall thickness and welded together at adjacent edges thereof.

4. A nuclear containment vessel as in claim 3, wherein said vessel includes a first portion at each end of the vessel having a first curvature and a first wall thickness, a second portion at a mid-portion of said vessel having a second curvature and a second wall thickness and a third portion intermediate said first and second portions and having a third curvature and a third wall thickness, said first curvature being greater than said third curvature and said third curvature being greater than said second curvature, the first wall thickness being less than the third wall thickness and the third wall thickness being less than the second wall thickness, each of said wall thicknesses at least at the welded together adjacent edges of said portions being not greater than the thickness at which post weld heat treatment is required.

5. A nuclear containment vessel as in claim 4, wherein the thickness of the plates at least at the edges of said portions is approximately 1½ inches.

6. A nuclear containment vessel as in claim 4, wherein a crane rail is supported on an inside surface of said vessel above the vertical mid-portion thereof in said second portion, and a polar crane is supported on said crane rail.

7. A nuclear containment vessel as in claim 6, wherein an access hatch is in one side of said vessel below the vertical mid-portion thereof and in said second portion.

8. A nuclear containment vessel as in claim 3, wherein the said at least three portions of the upper half of the vessel are substantially identical to the said at least three portions of the lower half of the vessel, said upper and lower halves being mirror images of each other.

9. A nuclear containment vessel as in claim 8, wherein said portions each comprise segments of different ellipsoids of revolution.

10. A nuclear containment vessel supporting and containing a nuclear reactor, a turbine and other auxiliary equipment therewithin, said containment vessel comprising a plurality of superposed, prefabricated annular rings welded together at adjacent edges, said rings comprising a plurality of concavo-convex steel plates welded together at adjacent edges, said welded together rings defining a concavo-convex vessel having a horizontal dimension of at least about 140 feet and a vertical dimension of at least about 200 feet, the ratio of the horizontal dimension to the vertical dimension being at least less than about 0.85 and the vessel being substantially an egg shape with an upper end and a lower end, the upper end having a shorter radius of curvature than the lower end, the concavo-convex configuration of the containment vessel resulting in the thickness of the steel plates at least at the edges of the rings being not greater than the thickness at which post weld heat treatment is required by applicable codes in such a containment vessel, while at the same time the above structure results in the containment vessel having sufficient strength and size to withstand forces imposed thereon due to malfunction of the nuclear reactor or auxiliary equipment supported and confined therewithin, thus resulting in a substantial savings in material and time and cost of construction of the nuclear containment vessel, and resulting in the containment vessel occupying a smaller horizontal area than prior art nuclear containment vessels of a predetermined comparable volumetric capacity, a concrete biological shield building surrounding the containment vessel in spaced relationship thereto to prevent escape of radiation, and said vessel supported at a lower end portion thereof on a concrete foundation, said concrete foundation contacting and contoured to conform to the shape of the lower end portion of the vessel.

11. A nuclear containment vessel as in claim 3, wherein the upper and lower halves of said vessel each comprise at least three portions having different curvatures and different wall thicknesses and said portions welded together at adjacent edges thereof.

12. A nuclear containment vessel as in claim 11, wherein said vessel includes a first portion at the upper end of said vessel having a first curvature and a first wall thickness, a second portion at the midportion of said vessel having a second curvature and a second wall thickness, a third portion intermediate said first and second portions and having a third curvature and a third wall thickness, and a fourth portion at the bottom end of said vessel having a fourth curvature and a fourth wall thickness, said first curvature being greater than said third curvature and said third curvature being greater than said second curvature, said first wall thickness being less than the third wall thickness and the third wall thickness being less than the second wall thickness, said fourth curvature being greater than the second curvature and the fourth wall thickness being approximately equal to said second wall thickness, each of said wall thicknesses at least at the adjacent welded together edges of the portions being not greater than the thickness at which post weld heat treatment is required.

13. A nuclear containment vessel as in claim 12, wherein a crane rail is supported on the inside surface of said vessel above the vertical mid-portion thereof in said second portion and a polar crane is supported on said crane rail.

14. A nuclear containment vessel as in claim 13, wherein an access hatch is in one side of said vessel below the vertical mid-portion thereof and in said second portion.

15. A nuclear containment vessel supporting and containing a nuclear reactor and auxiliary equipment therein, said containment vessel comprising a plurality of superposed, prefabricated annular rings welded together at adjacent edges, said rings comprising a plurality of concavo-convex steel plates welded together at adjacent edges, said welded together rings defining a concavo-convex vessel having a horizontal dimension of at least about 140 feet and a vertical dimension of at least about 200 feet, the ratio of the horizontal dimension to the vertical dimension being at least less than about 0.85, said vessel comprising an upper concavo-convex main shell section and a lower concavo-convex main shell section, and an annular reinforcing band of less horizontal dimension than the upper and lower main shell sections between the adjacent ends of said upper and lower main shell sections joining said upper and lower main shell sections together, the concavo-convex configuration of the containment vessel resulting in the thickness of the steel plates at least at the edges of the rings being not greater than the thickness at which post weld heat treatment is required by applicable codes in such a containment vessel, while at the same time the above structure results in the containment vessel having sufficient strength and size to withstand forces imposed thereon due to malfunction of the nuclear reactor or auxiliary equipment supported and confined therewithin, thus resulting in a substantial savings in material and time and cost of construction of the nuclear containment vessel, and resulting in the containment vessel occupying a smaller horizontal area than prior art nuclear containment vessels of a predetermined comparable volumetric capacity, a concrete biological shield building surrounding the containment vessel in spaced relationship thereto to prevent escape of radiation, and said vessel supported at a lower end portion thereof on a concrete foundation, said concrete foundation contacting and contoured to conform to the shape of the lower end portion of the vessel.

16. A nuclear containment vessel as in Claim 15, wherein the upper main shell section comprises two portions having a first radius of curvature and a first wall thickness, said lower main shell section comprises four portions having different radii of curvature and different wall thicknesses, and said reinforcing band comprises a portion having a different radius of curvature than the adjacent portions of the upper and lower main shell sections.

17. A nuclear containment vessel as in claim 16, wherein the upper main shell section comprises a hemispherical portion and a spherical zone portion, said portions having the same radius of curvature and the same wall thickness.

18. A nuclear containment vessel as in claim 17, wherein said wall thickness of the upper main shell section is approximately 1 inch and the radius of curvature is approximately 75 feet.

19. A nuclear containment vessel as in class 18, wherein said lower main shell section comprises a first portion having the shape of two truncated ogives with a common base between them, said portion merged into a second portion having the shape of a truncated non-standard ogive, and said second portion merged into a third portion having the shape of a spherical segment.

20. A nuclear containment vessel as in claim 19, wherein said first portion has a first radius of curvature and a first wall thickness, said second portion has a second radius of curvature less than said first radius of curvature and a second wall thickness less than said first wall thickness, and said third portion has a third radius of curvature greater than the second radius of curvature and a third wall thickness.

21. A nuclear containment vessel as in claim 20, wherein said reinforcing band portion has a wall thickness greater than the wall thickness of the upper and lower main shell sections.

22. A nuclear containment vessel as in claim 21, wherein the reinforcing band portion has a wall thickness of approximately 3 inches.

23. A nuclear containment vessel as in claim 22, wherein the first radius of curvature is about 135 feet, the first wall thickness is about 1.43 inches, the second wall thickness is about 1.17 inches, the second radius of curvature is about 45 feet, the third wall thickness is about 1.17 inches, and the third radius of curvature is about 90 feet.

24. A nuclear containment vessel as in claim 20, wherein a crane rail is supported on said reinforcing band and a polar crane is supported on said crane rail for servicing nuclear equipment and associated auxiliary equipment in the lower portion of said vessel.

25. A nuclear containment vessel as in claim 24, wherein the crane rail and reinforcing band are above the vertical mid-portion of the vessel.

26. A nuclear containment vessel as in claim 15, wherein a plurality of circumferentially extending, vertically spaced, annular plates are welded to said reinforcing band adjacent the upper and lower edges thereof and inside said vessel.

27. A nuclear containment vessel as in claim 26, wherein said annular reinforcing band further includes a plurality of circumferentially spaced, radially extending diaphragm plates welded to said annular reinforcing band and to said spaced annular reinforcing plates.

28. A nuclear containment vessel as in claim 27, wherein a crane rail is supported from the reinforcing band.

29. A nuclear containment vessel as in claim 15, wherein said annular reinforcing band comprises a cylindrical portion welded between the adjacent ends of said main shell sections, and a pair of vertically spaced, annular T-section reinforcing means welded to said cylindrical portion adjacent the upper and lower edges thereof.

30. A nuclear containment vessel as in claim 29, wherein said annular, T-section reinforcing means are on the inside surface of said reinforcing band.

31. A nuclear containment vessel as in claim 29, wherein said annular, T-section reinforcing means are on the outside surface of said reinforcing band.

32. A nuclear containment vessel as in claim 15, wherein said annular reinforcing band comprises a doubly curved annular ring welded between adjacent edges of said main shell sections and having a concave side and a convex side, with the concave side facing outwardly of said vessel.

33. A nuclear containment vessel as in claim 15, wherein the horizontal dimension of the vessel is about 154 feet and the vertical dimension of the vessel is about 223 feet.

34. A nuclear containment vessel as in claim 15, wherein at least one annular reinforcing means is attached to at least one of the main shell sections near to said adjacent edges.

35. A nuclear containment vessel supporting and containing a nuclear reactor and auxiliary equipment therewitin, said containment vessel comprising a plurality of superposed, prefabricated annular rings welded together at adjacent edges, said rings comprising a plurality of concavo-convex steel plates welded together at adjacent edges, said welded together rings defining a concavo-convex container having a horizontal dimension of at least about 140 feet and a vertical dimension of at least about 200 feet, the ratio of the horizontal dimension to the vertical dimension being at least less than about 0.85, said vessel comprising an upper main shell section, a lower main shell section, and an intermediate main shell section, said main shell sections being joined together at adjacent ends by a pair of vertically spaced, annular reinforcing bands of less horizontal dimension than the main shell sections, the concavo-convex configuration of the containment vessel resulting in the thickness of the steel plates at least at the edges of the rings being not greater than the thickness at which post weld heat treatment is required by applicable codes in such a containment vessel, while at the same time the above structure results in the containment vessel having sufficient strength and size to withstand forces imposed thereon due to malfunction of the nuclear reactor or auxiliary equipment supported and confined therewithin, thus resulting in a substantial savings in material and time and cost of construction of the nuclear containment vessel, and resulting in the containment vessel occupying a smaller horizontal area than prior art nuclear containment vessels of a predetermined comparable volumetric capacity, a concrete biological shield building surrounding the containment vessel in spaced relationship thereto to prevent escape of radiation, and said vessel supported at a lower end portion thereof on a concrete foundation, said concrete foundation contacting and contoured to conform to the shape of the lower end portion of the vessel.

36. A nuclear containment vessel as in claim 35, wherein the upper main shell section comprises two portions, said two portions comprising a hemispherical portion merged into a spherical zone portion, and said spherical zone portion merged into one of said spaced reinforcing bands, said reinforcing band comprising a third portion.

37. A nuclear containment vessel as in claim 36, wherein said two portions have a first radius of curvature and a first wall thickness, and said third portion has a second radius of curvature and a second wall thickness, said second radius of curvature being different than said first radius of curvature and said second wall thickness being different than said first wall thickness.

38. A nuclear containment vessel as in claim 37, wherein said second radius of curvature is less than said first radius of curvature, and said second wall thickness is greater than said first wall thickness.

39. A nuclear containment vessel as in claim 37, wherein said intermediate main shell section comprises a fourth portion in the shape of two truncated ogives with a common base and having a third radius of curvature and a third wall thickness, said third radius of curvature being greater than said first radius of curvature and said third wall thickness being greater than said first wall thickness.

40. A nuclear containment vessel as in claim 39, wherein said intermediate main shell section is merged into the other of said reinforcing bands, said other reinforcing band comprising a fifth portion having fourth radius of curvature and a fourth wall thickness, said fourth radius of curvature being different than said first radius of curvature, and said fourth wall thickness being approximately equal to the second wall thickness.

41. A nuclear containment vessel as in claim 40, wherein the lower main shell section comprises a plurality of portions including a sixth portion having the shape of two truncated ogives with a common base and joined to said fifth portion at the upper end thereof, and having a fifth radius of curvature and a fifth wall thickness, said fifth radius of curvature being approximately equal to said third radius of curvature and said fifth wall thickness being approximately equal to said third wall thickness, said sixth portion merging at its lower end into a seventh portion having the shape of a non-standard truncated ogive and a sixth radius of curvature and a sixth wall thickness, said sixth radius of curvature being less than said first radius of curvature and said sixth wall thickness being greater than said first wall thickness, and said seventh portion merging into an eighth portion having the shape of a spherical zone and having a seventh radius of curvature and a seventh wall thickness, said seventh radius of curvature being greater than said frist radius of curvature and less than said fifth radius of curvature and said seventh wall thickness being greater than said first wall thickness.

42. A nuclear containment vessel as in claim 41, wherein said first radius of curvature is approximately 75 feet, said second radius of curvature is approximately 57 feet, said third radius of curvature is approximately 150 feet, said fourth radius of curvature is approximately 62 feet, said fifth radius of curvature is approximately 150 feet, said sixth radius of curvature is approximately 45 feet, and said seventh radius of curvature is approximately 90 feet.

43. A nuclear containment vessel as in claim 42, wherein a crane rail is supported on the inside surface of said vessel at said upper annular reinforcing band, and an access hatch is in the side of said vessel at the lower annular reinforcing band.

44. A nuclear containment vessel as in claim 40, wherein said fourth radius of curvature is greater than said second radius of curvature but less than said first radius of curvature.

45. A nuclear containment vessel as in claim 35, wherein the horizontal dimension of the vessel is about 150 feet and the vertical dimension of the vessel is about 223 feet.

* * * * *

UNITED STATES PATENT OFFICE
CERTIFICATE OF CORRECTION

Patent No. 3,793,145   Dated February 19, 1974

Inventor(s) ROBERT W. JORDAN, ROGER L. CORINTH, NORMAN W. EDWARDS and STEPHEN M. PREG, JR.

It is certified that error appears in the above-identified patent and that said Letters Patent are hereby corrected as shown below:

> Please correct the spelling of
> ROGER L. CORINTH's name which is
> incorrectly spelled CORNITH in the
> Patent Grant Signed and sealed this 24th day of September 1974.

(SEAL)
Attest:

McCOY M. GIBSON JR.
Attesting Officer

C. MARSHALL DANN
Commissioner of Patents